United States Patent
Dobbin et al.

(10) Patent No.: US 10,215,216 B2
(45) Date of Patent: Feb. 26, 2019

(54) METHOD OF INSTALLING A SPARK CONTAINMENT CAP

(71) Applicant: AIRBUS OPERATIONS LIMITED, Bristol (GB)

(72) Inventors: Richard Dobbin, Bristol (GB); Ben Humphrys, Chester (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 490 days.

(21) Appl. No.: 15/013,082

(22) Filed: Feb. 2, 2016

(65) Prior Publication Data

US 2016/0230801 A1  Aug. 11, 2016

(30) Foreign Application Priority Data

Feb. 9, 2015 (GB) .................................. 1502133.0

(51) Int. Cl.
*F16B 37/14* (2006.01)
*B64D 45/02* (2006.01)
*F16B 33/00* (2006.01)

(52) U.S. Cl.
CPC .............. *F16B 37/14* (2013.01); *B64D 45/02* (2013.01); *F16B 33/004* (2013.01); *Y10T 29/49948* (2015.01)

(58) Field of Classification Search
CPC . F16J 15/26; F16J 15/28; F16J 15/162; B23P 11/025; B23P 11/022; Y10T 29/49867; Y10T 29/49876
See application file for complete search history.

(56) References Cited

U.S. PATENT DOCUMENTS

| 4,905,931 A | 3/1990 | Covey |
| 7,967,587 B2 * | 6/2011 | Bradley .................... B05C 9/14 249/157 |
| 2012/0286451 A1 * | 11/2012 | Toda ................... B29C 45/0025 264/328.16 |
| 2014/0341675 A1 | 11/2014 | Dobbin |

FOREIGN PATENT DOCUMENTS

| EP | 0334011 A1 | 9/1989 |
| GB | 2510131 A | 7/2014 |
| GB | 2514171 A | 11/2014 |
| WO | 2015025130 A1 | 2/2015 |

OTHER PUBLICATIONS

Search Report dated Apr. 22, 2015 in Great Britain Application No. 1502133.0.

* cited by examiner

*Primary Examiner* — Sarang Afzali
*Assistant Examiner* — Ruth G Hidalgo-Hernandez
(74) *Attorney, Agent, or Firm* — Nixon & Vanderhye P.C.

(57) ABSTRACT

A method of forming a sealed cavity around an end of a fastener protruding from a structure is disclosed having the steps of: (i) installing a cap having a cap body terminating at a rim which surrounds an opening of a cavity over the end of the fastener so that the end of the fastener is enclosed within the cavity; (ii) heating the cap to increase a temperature within the cavity; (iii) providing a bead of uncured sealing material around the rim of the cap body to seal a volume of gas within the cavity; and (iv) curing the bead of sealing material during a cure period.

13 Claims, 6 Drawing Sheets

METHOD OF INSTALLING A SPARK CONTAINMENT CAP

RELATED APPLICATIONS

The present application claims priority from Great Britain Application Number 1502133.0, filed Feb. 9, 2015, the disclosure of which is hereby incorporated by reference herein in its entirety.

FIELD OF THE INVENTION

The present invention relates to a method of forming a sealed cavity around an end of a fastener, and in particular to such a method comprising installing a spark containment cap over the fastener end.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightening attachment at any of the many metallic fasteners in the exterior surface, which have a much lower electrical resistance. In the wing, some of these fasteners pass through the outer wing skin into the fuel tank.

FIG. 1 is a side view of part of a fastener assembly passing through a panel 1, which may be a composite or metallic panel. The assembly comprises a fastener comprising an externally threaded bolt 2, an internally threaded nut 3, and a washer 4 (the fastener may alternatively comprise any other known fastener type, such as a rivet or swage fastener). In the event of a lightning strike hitting the panel 1 and attaching to the fastener, sparking, plasma or out-gassing may occur at the locations indicated by reference 5 in FIG. 1. The panel 1 may provide a fuel tank boundary and the fastener may therefore be immersed in fuel or fuel vapour rich gas. A lightning strike at the fastener may thus provide sparking and hot gas ignition sources which could cause ignition of the fuel.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

A first aspect of the invention provides a method of forming a sealed cavity around an end of a fastener protruding from a structure, the method comprising: (i) installing a cap having a cap body terminating at a rim which surrounds an opening of a cavity over the end of the fastener so that the end of the fastener is enclosed within the cavity; (ii) heating the cap to increase a temperature within the cavity; (iii) providing a bead of uncured sealing material around the rim of the cap body to seal a volume of gas within the cavity; and (iv) curing the bead of sealing material during a cure period, wherein step (ii) is carried out before step (iii), and step (iii) is carried out when the temperature within the cavity is equal to or higher than an ambient temperature.

This method ensures that the pressure of the volume of gas trapped within the cavity (step (iii)) will not exceed (or at least not substantially exceed) the ambient pressure while the sealing material is curing (or while it at least partially cures, or is in the early stages of curing). Such a positive pressure difference has been found to be undesirable because it can have the effect of causing defects within the bead of sealing material, such as air bubbles or voids, caused as the pressurised gas tries to escape from the cavity. Such air bubbles are undesirable because they may compromise the quality of the seal around the cavity and thereby cause leakage of fuel through the fastener joint and/or may provide sites for uncontrolled sparking or out-gassing events.

The inventors have determined that an undesirable positive pressure difference, as described above, can be avoided by heating the trapped gas within the cavity to a temperature equal to or greater than the maximum expected ambient temperature (step (ii)) before installing the sealing material (step (iii)). The resulting drop in temperature of the trapped air within the cavity during cure of the sealing material (or at least during the early stages of cure, i.e. partial cure) will result in a pressure drop within the cavity, such that there is a negative pressure difference between the cavity and ambient (i.e. the pressure within the cavity is lower than the ambient pressure). Such a negative pressure difference can be tolerated, since it has been found to not result in the sealing material defects that a positive pressure difference can cause. In cases where the ambient temperature is equal to the maximum expected ambient temperature during installation and cure of the sealing material, there will be no pressure difference. Like a negative pressure difference, a lack of pressure difference also has the desirable effect of avoiding sealing defects.

In preferred embodiments the ambient temperature comprises a maximum ambient temperature during the cure period. Thus, ambient temperature fluctuations, such as diurnal fluctuations, can be tolerated. This is particularly important for sealing materials with long cure times.

The temperature within the cavity may be increased in any one of a number of ways. For example, wherein step (ii) may be carried out by directing a flow of heated air at, or in to, the cap body. Alternatively, step (ii) may be carried out by placing a heated pad in contact with the cap body.

In some embodiments step (i) includes providing a plurality of caps, each cap having a cap body terminating at a rim which surrounds an opening of a cavity for receiving the end of the fastener, step (iii) includes providing a bead of uncured sealing material around the rim of each cap body to seal the respective cavity, and in step (ii) the heated pad is placed in contact with each of the plurality of caps substantially simultaneously before steps (iii) and (iv) are carried out. In this way, multiple caps can be heated at once in order to reduce installation time.

The cap may comprise an annular skirt extending radially outwardly from the cap body, and a sealing material inlet in fluid communication with the annular sealing volume, and step (iii) may include injecting the uncured sealing material into the annular sealing volume via the sealing material inlet to provide the bead of uncured sealing material. The sealing material inlet may be provided in the annular skirt, or elsewhere in the cap body. In preferred embodiments step (ii) includes providing a flow of heated air into the annular sealing volume via the sealing material inlet. Thus, the sealing material inlet may be dual purpose.

In such injectable cap embodiments the cap may comprise an inner cap member and an outer cap member, the sealing material inlet may be provided in the outer cap member, one or more channels between the inner and outer cap members may provide fluid communication between the sealing material inlet and the annular sealing volume, and step (ii) may include providing a flow of heated air into the one or more channels via the sealing material inlet.

In step (iv) the cure period preferably comprises a period of time during which the bead of sealing material at least partially cures. That is, the sealing material may experience several stages of cure, including an initial cure period in which it is subject to (at risk of) defects caused by a positive pressure difference within the cavity, and a subsequent cure period in which it is sufficiently cured to resist the formation of such defects. The cure period of step (iv) preferably comprises at least the initial cure period.

In some embodiments the cap may be installed over the end of the fastener before step (ii) is carried out, while in other embodiments step (ii) may be carried out before the cap is installed over the end of the fastener.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
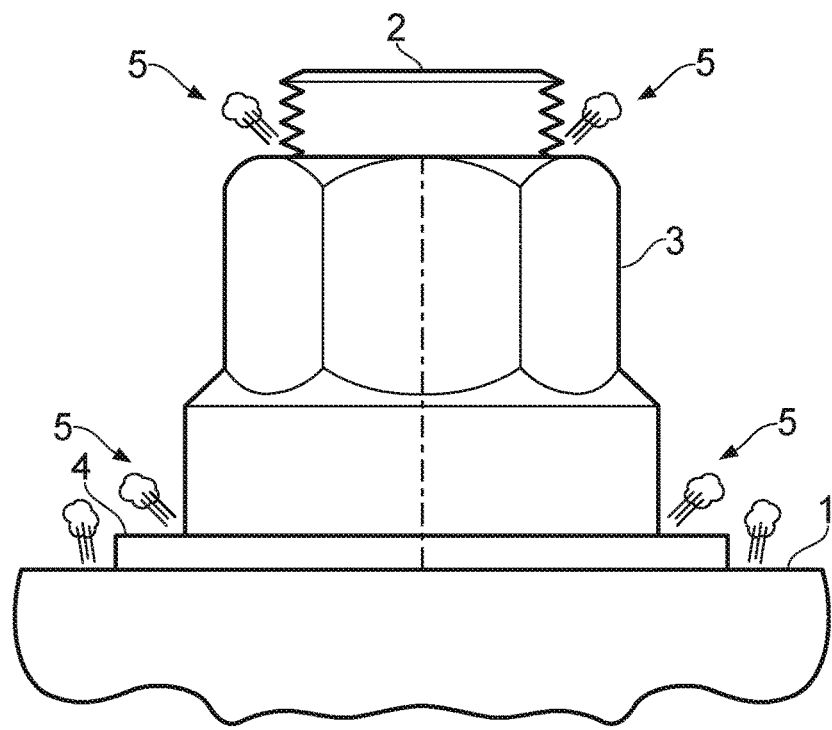
FIG. 1 shows a side view of a prior art fastener joint.
Figure 2:
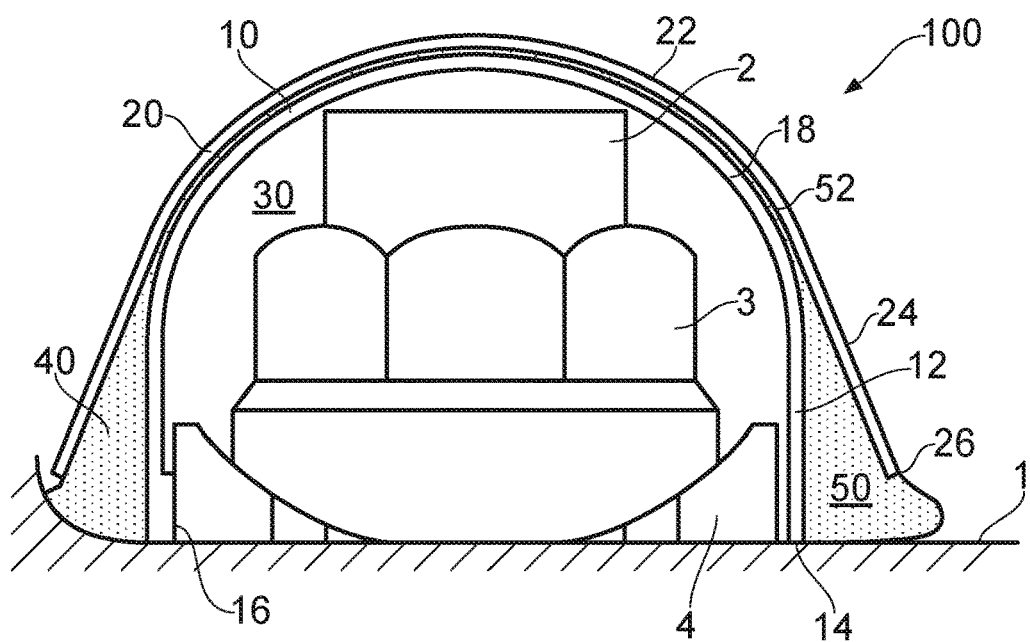
FIG. 2 shows a cross-sectional view of a prior art spark containment cap installed over a fastener end.

FIG. 2 illustrates a prior art spark containment cap 100 which can be used in a method according to an embodiment of the invention to form a sealed cavity 30 around the end of a fastener protruding from a structural member 1. In this embodiment the fastener end comprises the tail end of a bolt 2 in threaded engagement with a nut 2 seated on a spherical washer 4. In other embodiments the fastener end may comprise the head end of the bolt 2, or the fastener may comprise any other known fastener type, such as a rivet or swage fastener.

The cap 100 comprises an inner cap member 10 and an outer cap member 20 which is fitted snugly over the inner cap member 10. The inner and outer cap members 10, 20 are injection moulded from a thermoplastic material such as glass-filled polyetherimide (PEI). A suitable glass-filled PEI is Ultem™ 2400, which includes 40% glass fibres by volume. The inner and outer cap members may alternatively be made by moulding, by an additive manufacturing process, or by any other suitable process.

The inner cap member 10 comprises a generally cylindrical collar portion 12 which has a circular rim 14 which encloses an opening 16 into the cavity 30, the rim 14 abutting a surface of the structural member 1. The collar portion 12 encircles the fastener end and engages the periphery of the washer 4 to provide a mechanical connection between the cap 100 and the fastener end. At the opposite end to the rim 14 (in an axial direction) the collar portion 12 merges with a generally dome-shaped portion 18 of the inner cap member 10 which provides an end wall opposite the opening 16 such that the opening provides the only entrance to the cavity 30.

The outer cap member 20 comprises a generally dome-shaped portion 22 which is shaped to enable it to fit snugly over the dome-shaped portion 18 of the inner cap member 10, as shown in FIG. 2. The dome-shaped portion 22 merges with a skirt portion 24 which flares radially outwardly from the dome-shaped portion 22 to a circular rim 26 which, in this example, is axially offset from the rim 14 of the inner cap member 10.

The flared skirt portion 24 and collar portion 12 define between them an annular sealing volume 40 which is filled with an uncured sealing material 50 that is subsequently cured to form an annular bead of sealing material. The bead of sealing material 50 seals the join between the rim 14 of the inner cap member 10 and the structural member 1 in order to seal a volume of air (or other gas) within the cavity 30. The bead of sealing material also serves to bond the inner 10 and outer 20 caps together, and to bond the cap 100 to the structural member 1. An interfay layer 52 of sealing material serves to fill any voids between the domed portions 18, 22 of the inner 10 and outer 20 caps, and to further strengthen the bond therebetween.

The invention proposes a method of installing such a cap 100 (or other suitable spark containment cap having an air cavity) in which the air (or other gas) within the cavity 30 is locally heated prior to the application of the sealing material 50 within the annular sealing volume 40.

The inventors have determined that the pressure of the trapped air within the cavity (after installation of the cap) should not significantly exceed the ambient pressure (a positive pressure difference) while the sealing material 50 is curing (or while it at least partially cures, or is in the early stages of curing). Such a positive pressure difference is undesirable because it can have the effect of causing defects within the bead of sealing material, such as air bubbles or voids, caused as the pressurised air tries to escape from the cavity 30. Such air bubbles are undesirable because they may compromise the quality of the seal around the cavity and thereby cause leakage of fuel through the fastener joint and/or may provide sites for uncontrolled sparking or outgassing events.

The inventors have determined that an undesirable positive pressure difference, as described above, can be avoided by heating the trapped air within the cavity to a temperature equal to or greater than the maximum expected ambient temperature before installing the sealing material. The resulting drop in temperature of the trapped air within the cavity during cure of the sealing material (or at least during the early stages of cure, i.e. partial cure) will result in a pressure drop within the cavity, such that there is a negative pressure difference between the cavity and ambient (i.e. the pressure within the cavity is lower than the ambient pressure). Such a negative pressure difference can be tolerated, since it has been found to not result in the sealing material defects that a positive pressure difference can cause. In cases where the ambient temperature is equal to the maximum expected ambient temperature during installation and cure of the sealing material, there will be no pressure difference. Like a negative pressure difference, a lack of pressure difference also has the desirable effect of avoiding sealing defects.

Figure 3:
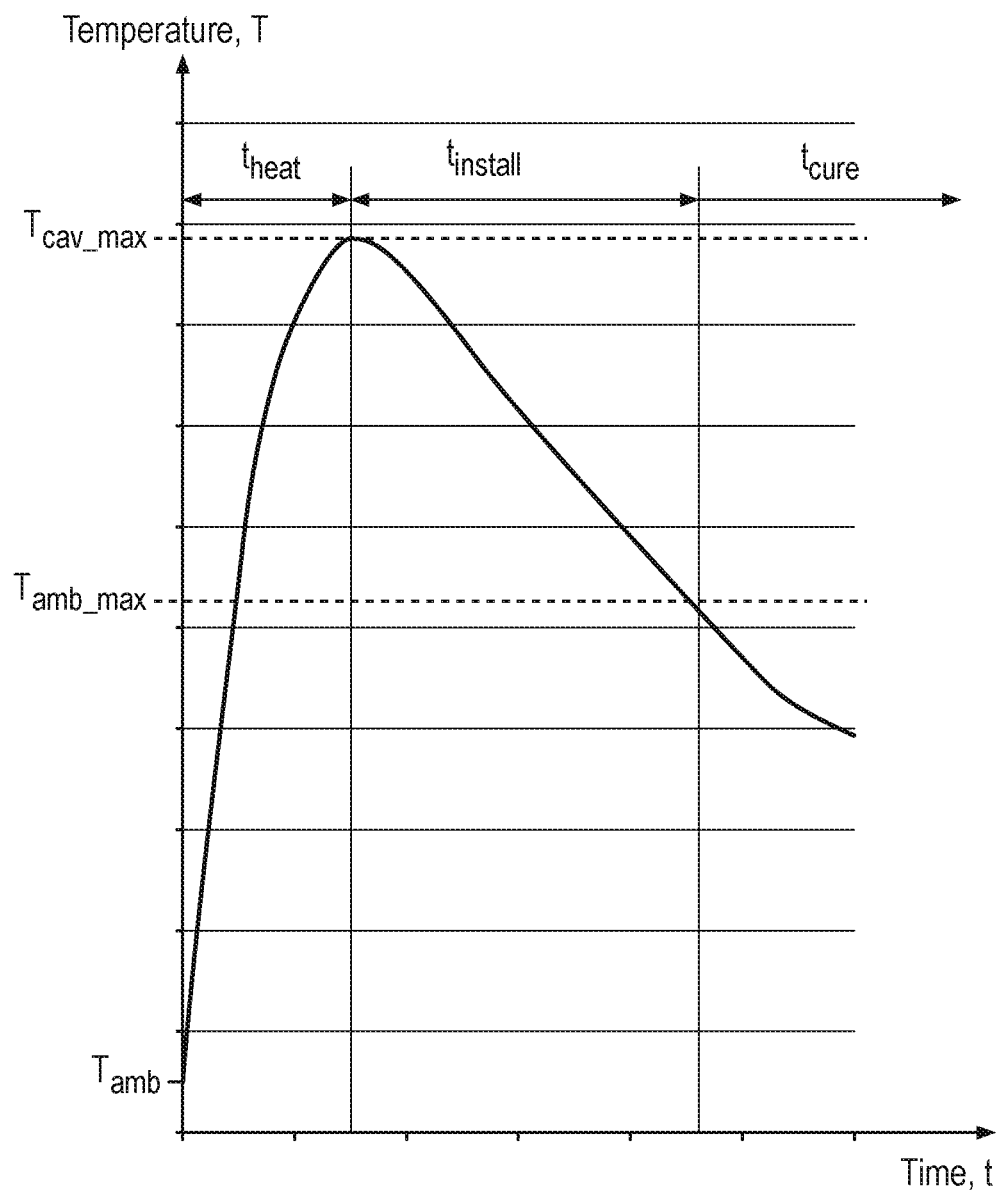
FIG. 3 shows a schematic graph illustrating a change in temperature of the contents of a spark containment cap cavity over time during an installation method according to an embodiment of the invention.

FIG. 3 shows an exemplary graph illustrating the desired change in temperature of the air within the cavity 30 over time according to the installation method. The cavity temperature is initially equal to the ambient temperature $T_{amb}$ at the time of heating, and then the cavity is heated (via any one of a number of methods, as discussed further below) to a maximum temperature $T_{cav\_max}$ over a heating period $t_{heat}$. The ambient temperature is assumed to be variable (e.g. due to diurnal temperature variations), and a maximum ambient temperature $T_{amb\_max}$ is determined.

The inventors have determined that the cap must be fully installed, including the application of the sealing material within the annular sealing volume 40, before the cavity temperature drops below the maximum ambient temperature $T_{amb\_max}$ in order to ensure that an undesirable positive pressure difference is avoided. Since it will not be practical in most cases to complete this installation immediately after the cavity is heated, the cavity temperature at the time of installing the sealing material within the annular sealing volume 40 will be lower than $T_{cav\_max}$. Thus, $T_{cav\_max}$ must be sufficiently higher than $T_{amb\_max}$ to ensure that the time period $t_{install}$ over which the temperature of the cavity will fall from $T_{cav\_max}$ to $T_{amb\_max}$ is sufficiently long to ensure that the sealing material will be applied within the annular sealing volume 40 before the cavity temperature falls below $T_{amb\_max}$.

The sealing window of $t_{install}$ thus provides a degree of flexibility to the installer, and potentially enables him or her to locally heat several caps 100 in a batch, before subsequently applying the bead of sealing material 50 to those caps 100.

In cases where the ambient temperature is lower than $T_{amb\_max}$ during application of the sealing material 50 into the annular volume (at which time the cavity temperature will be between $T_{cav\_max}$ and $T_{amb\_max}$), the cavity temperature will inevitably subsequently fall below $T_{amb\_max}$ as shown in FIG. 3. Such a fall in cavity temperature will cause a negative pressure difference to be created within the cavity. As discussed above, such a negative pressure difference is desirable because it has been found that sealing material defects can be avoided.

In cases where the ambient temperature is at its maximum of $T_{amb\_max}$ during application of the sealing material 50 into the annular volume 40, any subsequent fall in ambient temperature will cause a negative pressure difference to be created within the cavity. If the ambient temperature remains constant at $T_{amb\_max}$ then there will be no pressure difference between the cavity and ambient. Both possibilities (i.e. no pressure difference or a negative pressure difference) have been found to be acceptable such that they do not result in undesirable sealing material defects.

The ambient temperature may thus vary during the cure period $t_{cure}$ during which the sealing material 50 at least partially cures, but will always be below the maximum ambient temperature $T_{amb\_max}$. Such temperature variations are acceptable because of the negative pressure difference between the cavity and ambient provided by the cavity heating process, as described above. In particular, the ambient temperature may fluctuate up and down below its threshold of $T_{amb\_max}$.

The air within the cavity 30 may be heated in any one of a number of different ways. For example, a heat gun or other hot air heat source may be used to apply a flow of heated air to the cap 100, optionally directly to the cavity 30. Such a heated air flow may be applied either before the cap 100 is installed over the fastener end, or after installation. Alternatively, the cap 100 may be placed in an oven or other heating chamber prior to installation over the fastener end.

Figure 4A:
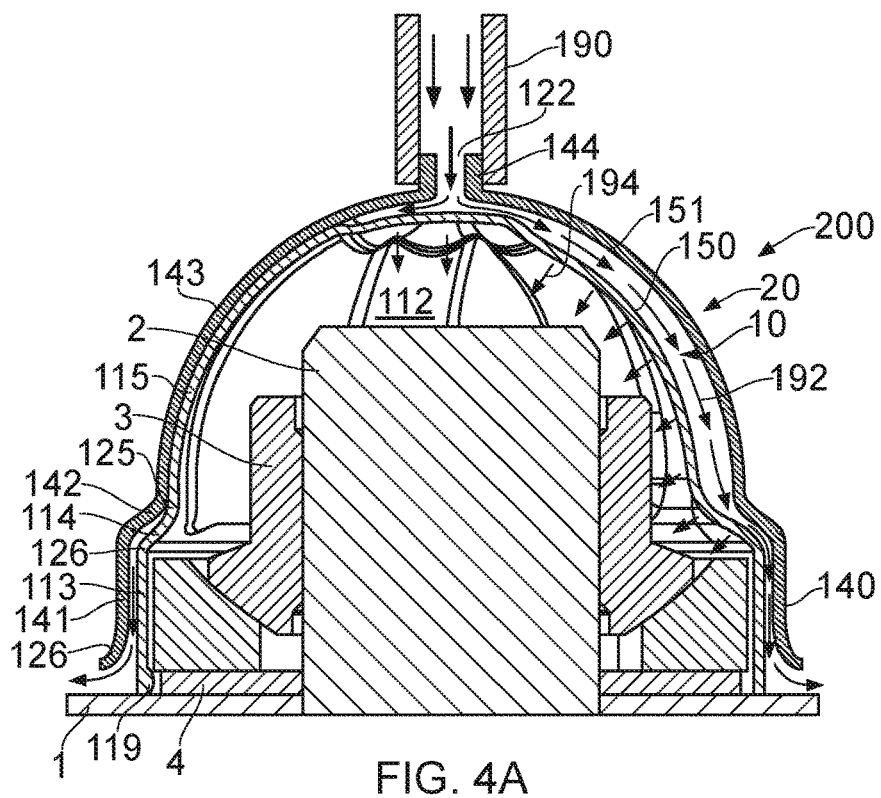
FIGS. 4A, 4B and 5 show cross-sectional views of a spark containment cap during different phases of an installation method according to an embodiment of the invention.
Figure 4B:
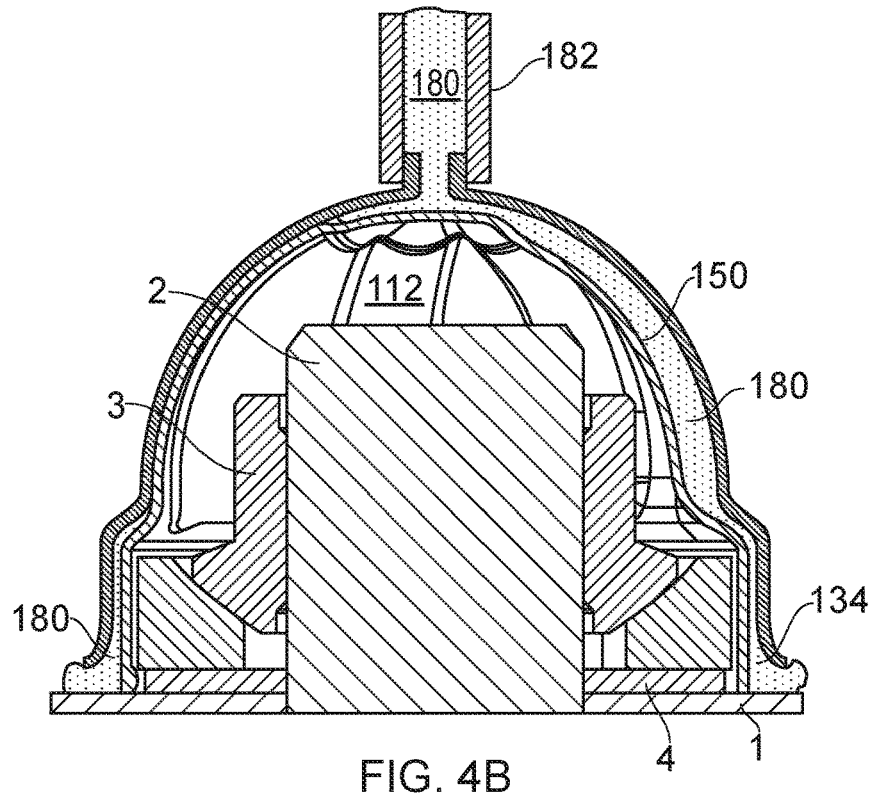
Figure 5:
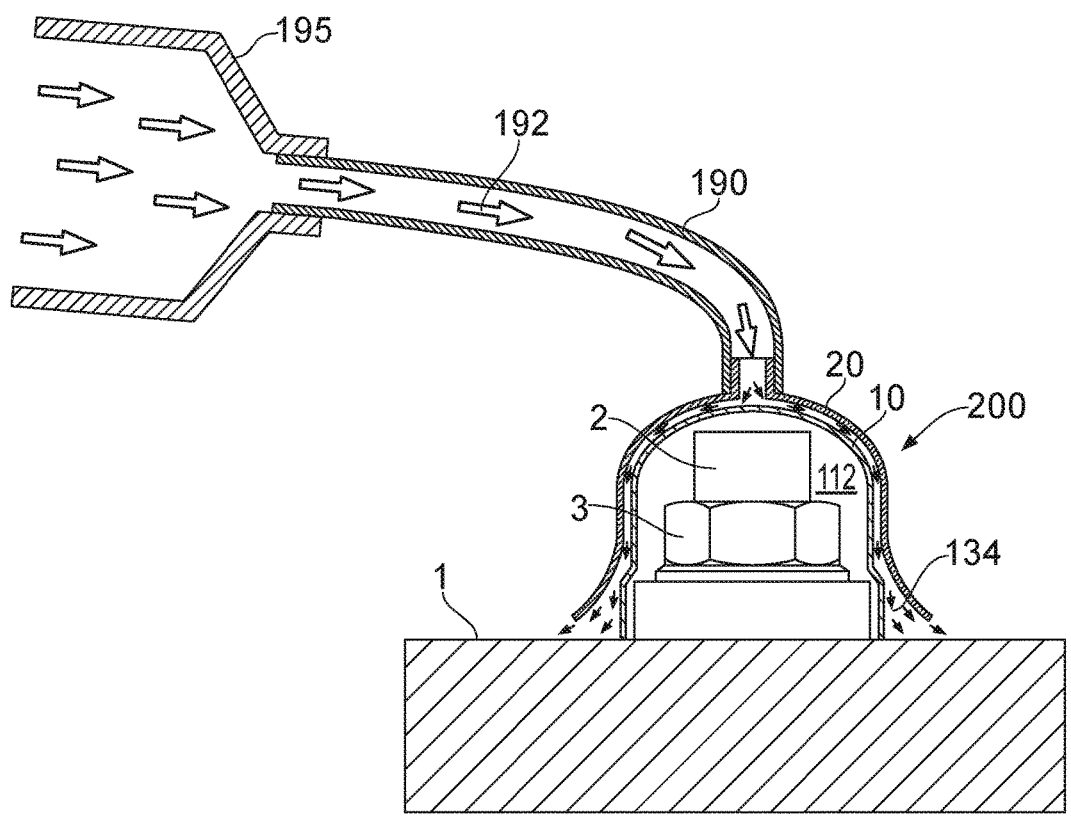

A heated air flow embodiment is illustrated in FIGS. 4A, 4B and 5, in which a heated air flow is applied directly to a two-part injectable cap 200 via a nozzle 190. The cap 200 is in many respects similar to the cap 100 of FIG. 2, and those features which are common to both embodiments will not be described further below.

The cap 200 includes an inner cap member 110 and an outer cap member 120. As in the first embodiment, the inner cap member 110 is a generally thin-walled dome-shaped member, with a correspondingly dome-shaped inner air cavity 112 which encloses the tail end of a fastener protruding from a structural element 1.

The inner cap member 110 comprises an annular base 113 which has a generally cylindrical outer surface, and a domed portion 115. A frustoconical shoulder 114 joins the cylindrical portion 113 to the domed portion 115 which extends from the shoulder to an apex. An outer diameter of the inner cap reduces at the shoulder 114 so the domed portion 115 has a smaller outer diameter than the annular base 113. The outer surfaces of the shoulder 114 and the domed portion 115 meet at a concave radius 125 and the outer surfaces of the shoulder 114 and the annular base 113 meet at a convex radius 126.

The exposed edge, or rim, 118 of the annular base 113 abuts the structural element 1 to fully encapsulate the end of the fastener within the air cavity 112. The annular base 113 has mechanical locking features for providing a mechanical connection between the inner cap member 110 and the fastener. In this example, the washer 4 has a reduced diameter compared with the nut 3 so that the overhanging part of the nut mates with three snap-fit projecting hooks 119 protruding from the inner surface of the cylindrical portion 113. These hooks 119 prevent the cap from being forced away from the structure 1 by the pressure of sealant material as it is injected.

The outer cap member 120 is also a generally thin-walled dome shaped member, and is shaped to fit over the inner cap member 110 so that a sealing volume is defined therebetween. The outer cap member 120 is generally made up of an annular skirt 140 and a smaller diameter domed portion 143. The annular skirt 140 has a cylindrical portion 141, a shoulder 142, and a flared lip 126 at its free edge. A boss 144 at the apex of the domed portion 143 defines an opening 122 in fluid engagement with the sealing volume, the boss 144 being sized to interconnect both with the nozzle 182 of a sealing material injector gun to enable sealing material 180 to be injected into the sealing volume, and with the nozzle 190 of a hot air gun, as described below.

The inner cap member 110 has side walls with a substantially uniform wall thickness. The side walls are corrugated to form six (or another suitable number thereof) radially outwardly projecting ridges 151 which between them define six channels 150 in an outer surface of the domed portion 115 of the inner cap member 110. The ridges 151 abut the inner surface of the domed portion 143 of the outer cap member 120 as shown in FIG. 2 so that the respective domed portions of the inner 110 and outer 120 caps are in contact over the surface area of the ridges 151, but are separated by a radial gap at the channels 150 formed between those ridges. The channels 150 thus provide a route via which sealing material 180 injected through the opening 122 via the boss 144 can flow between the domed portions of the inner 110 and outer 120 caps.

The sealing volume between the inner and outer cap members 110, 120 has three key regions: a reservoir 132 comprising a recess in an outer surface of the apex of the inner cap 110 directly beneath the sealing material inlet opening 122; an annular sealing volume (or pocket) 134 between the skirt 140 of the outer cap 120 and the annular base 113 of the inner cap 110; and the channels 150 which interconnect the reservoir 132 and the annular sealing volume 134.

The nozzle 182 of the sealing material injection device (see FIG. 4B) delivers a continuous flow of sealing material 180 into the sealing volume via the opening 122. In the present embodiment a two-part polysulphide (or polysulfide) based sealant, such as Chemetall Naftoseal™ MC238, or an appropriate polythioether sealant material, is suitable. Such sealants are either pre-mixed or mixed prior to application in a supplied cartridge of the injection device.

Alternatively, a two-part epoxy based structural adhesive such as Scotch-Weld™ 7256 B/A, produced by 3M™, may be used. These adhesives are supplied in cartridge form (50-250 ml cartridges being preferred) and mixed within the nozzle 182 on application by the injector gun.

Such sealing materials are free-flowing, have a low viscosity, and exhibit rapid cure at room temperature. The reservoir 132 is directly below the opening 122 so that it receives sealing material directly therefrom. The reservoir 132 serves to improve the flow of sealing material into the annular sealing volume 134 by providing a relatively low flow resistance, and also serves to provide an even, uniform flow into the channels 150. Once cured, the sealing material within the channels 150 serves to bond the inner cap member 110 and outer cap member 120 together, and adds structural rigidity to the cap 200.

The annular sealing volume 134 is open at its lower face such that the sealing material can flow outwardly from the annular sealing volume and into contact with the structural element 1. The sealing material then forms an annular bead around the periphery of the nut cap 200 (see FIG. 4B), the bead of sealing material serving to seal the cavity 112 in order to prevent escape of outgassing products, and to adhere the nut cap 200 to the structural element 1.

The lip 126 is axially offset from the base edge 118 of the inner cap member 110. This arrangement ensures that the outer cap member 120 does not clash with features of the structural element 1, such as ramps or radii (fillets), in the event that the fastener is located very close to such features. Such a potential clash is not uncommon in aircraft structures, where it is possible for the outer edge of a fastener to be located less than 1.6 mm from the tangent of a fillet with a 5 mm radius. It also ensures that the seal is able to accommodate small surface feature deviations in the structural element 1, and is sufficiently thick to have a degree of flexibility once cured.

During installation, the cap 200 is first placed in the position shown in FIGS. 4A and 5, with the tail end (or alternatively the head end) of the fastener enclosed within the air cavity 112. A nozzle 190 of a hot air flow source such as a hot air gun 195 (shown in FIG. 5) provides a continuous flow 192 of heated air (or other gas) through the sealing material opening 122, along the channels 150, and out of the cap 200 via the annular sealing volume 134. This continuous flow 192 of heated air causes the air (or other gas) within the cavity 112 to be heated, as indicated by arrows 194. Thus, the temperature of the air within the cavity can be increased to $T_{cav\_max}$, or at least to $T_{amb\_max}$.

The temperature of the air within the cavity can be measured by, for example, a thermocouple (not shown). Experiments may be conducted to establish both the temperature of the heated air flow 192 and the duration of that flow required to achieve a given air cavity temperature. Thus, the heating period $t_{heat}$ required to achieve $T_{cav\_max}$ (or $T_{amb\_max}$) can be determined.

In some embodiments it may be appropriate to apply a heated air flow 192 at 100 degrees centigrade, or higher, for a heating period $t_{heat}$ of approximately 5 seconds in order to achieve a $T_{cav\_max}$ of approximately 45 degrees centigrade in typical ambient conditions. In embodiments in which such high temperature air flows 192 may not be appropriate, such as in a confined work space such as a fuel tank of an aircraft wing box, it may be appropriate to apply a heated air flow 192 at a lower temperature but for a longer heating period. Thus, the temperature of the air flow 192 may be approximately 60 degrees centigrade, and the heating period $t_{heat}$ approximately 10 seconds.

In the present embodiment the heated air flow 192 is provided by a hot air gun 195. However, the use of such a device may not be appropriate in some environments, for health and safety reasons. An alternative arrangement may be to supply an unheated air flow to a heat exchanger, which serves to heat the air flow to an appropriate temperature. Any other suitable heated air flow source may be used.

Once the temperature of the air within the cavity 112 has reached $T_{cav\_max}$, the sealing material 180 must be injected within the installation period $t_{install}$ in order to ensure that the cavity temperature at the time of sealing material injection is equal to or higher than $T_{amb\_max}$. In embodiments in which the air in the cavity 112 is heated only to $T_{amb\_max}$ the sealing material 180 must be injected immediately.

To inject the sealing material 180, a nozzle 182 of a sealing material injector gun is fitted over the boss 144 to create a temporary seal therebetween. Pre-mixed sealing material 180 is then injected from the nozzle into the reservoir 132, where it collects. When the reservoir 132 is full it overflows, causing an evenly distributed flow of sealing material into the channels 150. Once the channels 150 are filled the pressure of the sealing material 180 increases to a level at which it is forced from the channels 150 into the annular sealing volume 134. The sealing material completely fills the annular sealing volume 134 until it flows out and into contact with the structure 1, at which point the flow of sealing material 180 from the nozzle is stopped.

After injection of the curable sealing material 180 into the sealing volume the nozzle is removed and the injected sealing material is left to cure. On curing, it provides a strong adhesive bond between the cap 200 and structure 1, and also between the inner and outer cap members 110, 120. Once cured, the injected sealing material 180 serves to fully seal the air cavity 112. Thus, trapped air within the air cavity 112 can provide a safe environment within which sparking and out-gassing events caused during a lightning strike can be contained. Ingress of fuel, water or other contaminants into the air cavity 12 is also prevented.

The sealing material 180 may cure to handling strength (i.e. a degree suitable to provide sufficient strength to withstand knocks or similar from assembly workers) in approximately 40 minutes for epoxy-based adhesive sealing materials, one hour for polythioether sealants, or over four hours for polysulphide sealants. This degree of cure of the sealing material 180 will determine the cure period $t_{cure}$ within which the sealing material becomes sufficiently cured to resist the formation of air bubbles, voids or other defects in the sealing material bead within the annular sealing volume 134 that may be caused by a pressure increase within the cavity 112.

Figure 6:
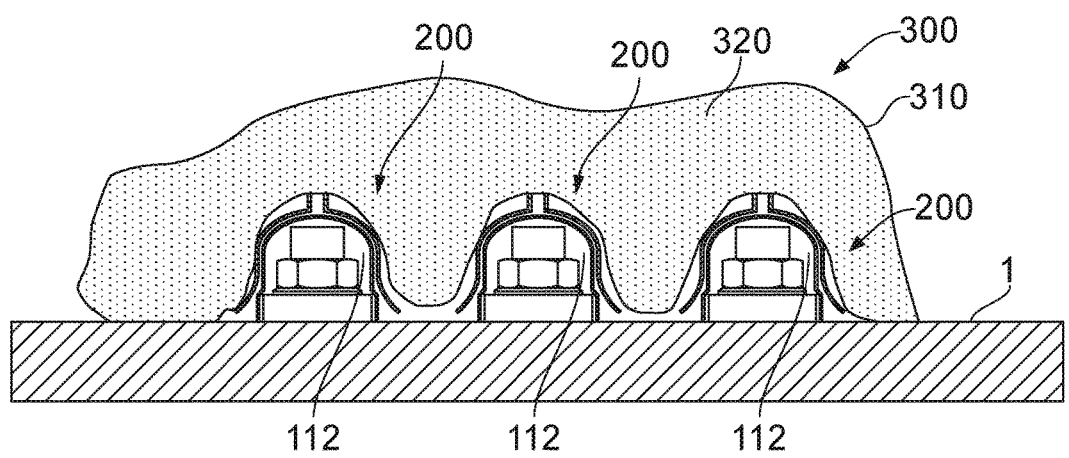
FIG. 6 shows a schematic cross-sectional view of a plurality of spark containment caps during the heating phase of an installation method according to an alternative embodiment of the invention.

FIG. 6 illustrates an embodiment in which a heat pad 300 is used to increase the air temperature within the cavities of multiple caps 200 installed over their respective fastener ends. The caps 200 are injectable caps of the type shown in FIGS. 4A, 4B and 5, and described above.

The heat pad 300 comprises a flexible outer membrane 310 filled with a heat retaining granular material 320. The granules 320 enable the heat pad 300 to deform such that flexible membrane 310 substantially conforms to the shape of the outer surfaces of the installed caps 200, as shown in FIG. 6.

During installation, the caps 200 are first placed in the positions shown in FIG. 6, with the tail end (or alternatively the head end) of the fastener enclosed within the air cavity 112. The heat pad 300 is heated by any appropriate method, such as by being placed in an oven or other heat chamber, and is then placed over the caps 200 so that each cap is covered by, and at least partially enveloped by, the heat pad 300. Heat is thus transferred from the heat retaining granular material 320 to the air (or other gas) within the cavities 112 of the caps 200. Thus, the temperature of the air within the cavities can be increased to $T_{cav\_max}$, or at least to $T_{amb\_max}$.

The temperature of the air within the cavity can be measured by, for example, a thermocouple (not shown). Experiments may be conducted to establish both the temperature of the heat retaining granular material 320 and the duration of application of the heat pad 300 required to achieve a given air cavity temperature. Thus, the heating period $t_{heat}$ required to achieve $T_{cav\_max}$ (or $T_{amb\_max}$) can be determined.

Once the temperature of the air within the cavity 112 has reached $T_{cav\_max}$, the sealing material 180 must be injected into the annular sealing volume 134 via the method described above within the installation period $t_{install}$, in order to ensure that the cavity temperature at the time of sealing material injection is equal to or higher than $T_{amb\_max}$. In embodiments in which the air in the cavity 112 is heated only to $T_{amb\_max}$ the sealing material 180 must be injected immediately.

In variations to the embodiment of FIG. 6 the heat pad 300 may be heated by a heat-generating chemical reaction within the heat pad, or by passing a hot fluid, such as air or water, through the heat pad. Alternatively, the heat pad 300 may be electrically heated by a plurality of current-carrying wires or filaments.

Figure 7:
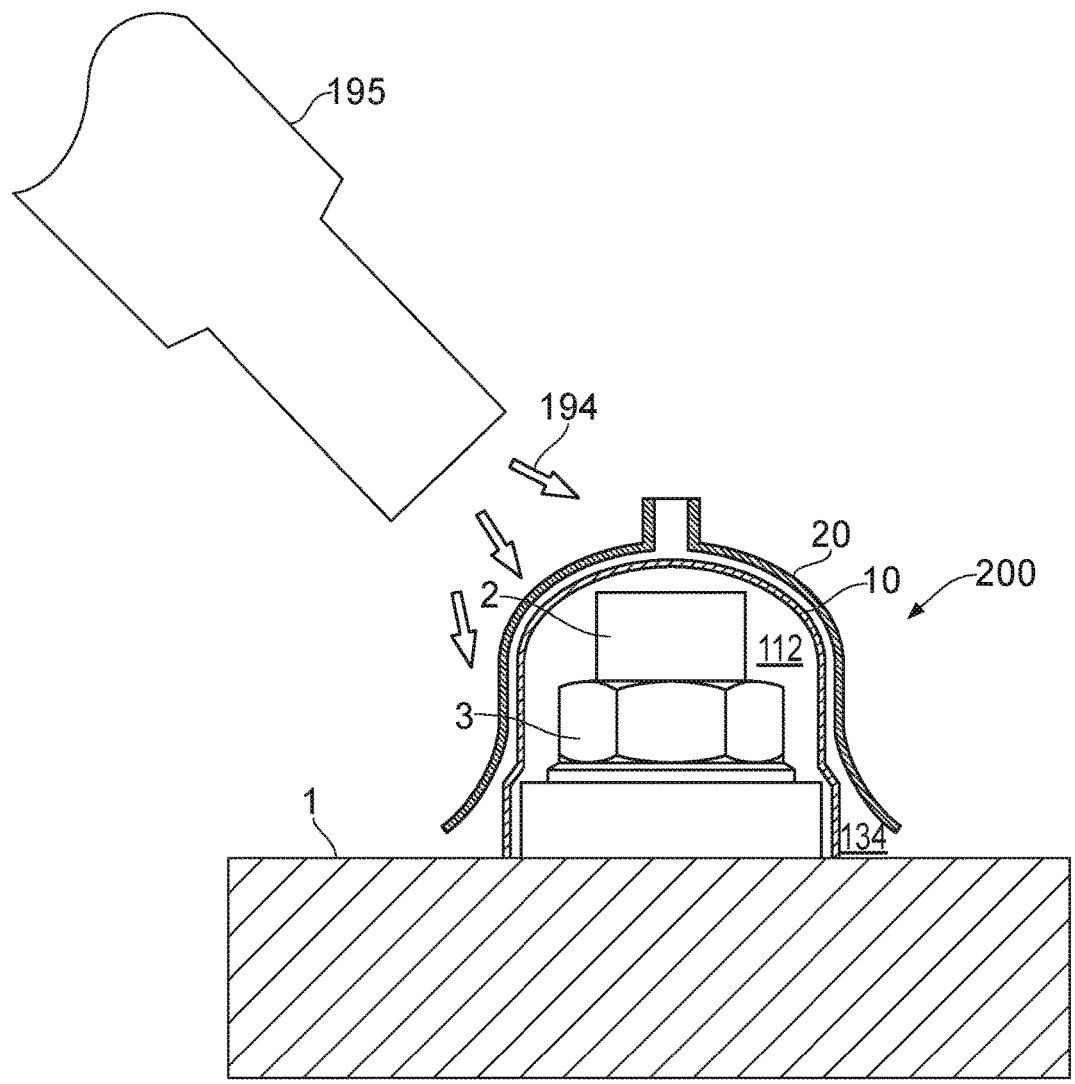
FIG. 7 shows a schematic cross-sectional view of a spark containment cap during the heating phase of an installation method according to a further alternative embodiment of the invention.

FIG. 7 illustrates an alternative embodiment in which a hot air gun 195, or other hot air flow generating device, is used to apply a hot air flow 194 to the exterior of a cap 200. The hot air flow 194 has the effect of heating the air within the cavity 112 to $T_{cav\_max}$ (or to at least $T_{amb\_max}$), as described above.

Although the caps 200 illustrated in FIGS. 6 and 7 are injectable caps of the type shown in FIGS. 4A, 4B and 5, any spark containment cap having an annular sealing volume may be installed using the local heating methods described above and illustrated in FIGS. 6 and 7. For example, the cap 100 shown in FIG. 2 may be installed using these methods, or a one-piece cap in which the inner 10 and outer 20 cap members are replaced by a single dome shaped cap member having an annular sealing volume 40, 134.

Although the invention has been described above with reference to one or more preferred embodiments, it will be appreciated that various changes or modifications may be made without departing from the scope of the invention as defined in the appended claims.

In particular, although the embodiments of FIGS. 2, 4A, 4B, 5, 6 and 7 illustrate two-part caps 100, 200 which comprise both inner and outer cap members, these separate parts may instead be formed in one piece so that the cap 100, 200 comprises a one-part cap.

The invention claimed is:

1. A method of forming a sealed cavity around an end of a fastener protruding from a structure, the method comprising: (i) installing a cap having a cap body terminating at a rim which surrounds an opening of a cavity over the end of the fastener so that the end of the fastener is enclosed within the cavity; (ii) heating the cap to increase a temperature within the cavity; (iii) providing a bead of uncured sealing material around the rim of the cap body to seal a volume of gas within the cavity; and (iv) curing the bead of sealing material during a cure period, wherein step (ii) is carried out before step (iii), and step (iii) is carried out when the temperature within the cavity is equal to or higher than an ambient temperature, whereby the cap is bonded to the structure.

2. The method according to claim 1, wherein the cap comprises an annular skirt extending radially outwardly from the cap body, and a sealing material inlet in fluid communication with the annular sealing volume, and step (iii) includes injecting the uncured sealing material into an annular sealing volume via the sealing material inlet to provide the bead of uncured sealing material.

3. The method according to claim 2, wherein step (ii) includes providing a flow of heated air into the annular sealing volume via the sealing material inlet.

4. The method according to claim 2, wherein the cap comprises an inner cap member and an outer cap member, the sealing material inlet is provided in the outer cap member, one or more channels between the inner and outer cap members provide fluid communication between the sealing material inlet and the annular sealing volume, and step (ii) includes providing a flow of heated air into the one or more channels via the sealing material inlet.

5. The method according to claim 1, wherein step (iii) includes installing or applying the bead of uncured sealing material around the rim of the cap body, and wherein step (ii) is carried out before the bead of uncured sealing material has been installed or applied around the rim of the cap body in step (iii).

6. The method according to claim 5, wherein the bead of uncured sealing material is installed or applied around the rim of the cap body by injection.

7. The method according to claim 1, wherein step (ii) is carried out by placing a heated pad in contact with the cap body.

8. The method according to claim 7, wherein step (i) includes providing a plurality of caps, each cap having a cap body terminating at a rim which surrounds an opening of a cavity for receiving the end of the fastener, step (iii) includes providing a bead of uncured sealing material around the rim of each cap body to seal the respective cavity, and in step (ii) the heated pad is placed in contact with each of the plurality of caps substantially simultaneously before steps (iii) and (iv) are carried out.

9. The method according to claim 1, wherein the ambient temperature comprises a maximum ambient temperature during the cure period.

10. The method according to claim 1, wherein step (ii) is carried out by directing a flow of heated air at the cap body.

11. The method according to claim 1, wherein in step (iv) the cure period comprises a period of time during which the bead of sealing material at least partially cures.

12. The method according to claim 1, wherein the cap is installed over the end of the fastener before step (ii) is carried out.

13. The method according to claim 1, wherein step (ii) is carried out before the cap is installed over the end of the fastener.

\* \* \* \* \*